United States Patent
Stanley et al.

[11] Patent Number: 6,061,746
[45] Date of Patent: May 9, 2000

[54] DEVICE BAY SYSTEM WITHOUT 1394 PHY/LINK INTERFACE TO DEVICE BAY CONTROLLER HAVING A SOFTWARE INTERCEPTING A GUID QUERY AND RETURNING A STORED UNIQUE IDENTIFIER

[75] Inventors: Paul C. Stanley, The Woodlands; Rahul V. Lakdawala, Cypress; Walter G. Fry; Richard Churchill, both of Spring, all of Tex.

[73] Assignee: Compaq Computer Corporation, Houston, Tex.

[21] Appl. No.: 09/070,233

[22] Filed: Apr. 30, 1998

[51] Int. Cl.[7] ............ G06F 13/14; G06F 13/10; G06F 9/445; G06F 15/17
[52] U.S. Cl. .......... 710/10; 710/2; 710/8; 710/62; 710/101; 710/102; 710/103; 710/104; 709/301; 709/302
[58] Field of Search ........... 709/300, 301, 709/302; 710/104, 2, 8, 10, 62, 100–103

[56] References Cited

U.S. PATENT DOCUMENTS

| | | | |
|---|---|---|---|
| 5,815,678 | 9/1998 | Hoffman et al. | 710/129 |
| 5,822,614 | 10/1998 | Kenton et al. | 710/8 |
| 5,948,076 | 9/1999 | Anubolu et al. | 710/8 |
| 5,963,431 | 10/1999 | Stancil | 361/803 |

*Primary Examiner*—Thomas C. Lee
*Assistant Examiner*—Ilwoo Park
*Attorney, Agent, or Firm*—Robert Groover

[57] ABSTRACT

A method for supporting a USB-based Device Bay Controller without a hardware interface between the DBC and the 1394 bus, by intercepting 1394 GUID queries in software and returning a stored GUID which is set by the manufacturer to be correct for the hardware actually present.

28 Claims, 5 Drawing Sheets

FIG. 9

DEVICE BAY SYSTEM WITHOUT 1394 PHY/LINK INTERFACE TO DEVICE BAY CONTROLLER HAVING A SOFTWARE INTERCEPTING A GUID QUERY AND RETURNING A STORED UNIQUE IDENTIFIER

BACKGROUND AND SUMMARY OF THE INVENTION

This disclosure relates to computers and the interface specifications for adding and upgrading peripheral devices to those computers.

Most personal computers ("PCs") designed today still implement peripheral devices based upon interfaces used in the original IBM PC designs of the early 1980s. These implementations have numerous shortcomings that cause both designers and users considerable frustration. Industry leaders are attempting to solve this incompatibility issue in favor of more platform-independent standards.

Background: Universal Serial Bus ("USB")

USB is a peripheral bus specification developed by PC and telecom industry leaders that brings the Plug-and-Play ("PnP") features of many computer peripherals to the outside of the computer chassis, eliminating the need to install cards into dedicated computer slots and reconfigure the system. PCs equipped with USB and PnP allow computer peripherals to be automatically configured as soon as they are physically attached—without the need to reboot or run setup utilities ("hot pluggable"). The resource constraints related to IO address space, IRQ lines, and DMA channels no longer exist with the USB implementation. USB also allows multiple devices—up to 127—to run simultaneously on a computer, with peripherals such as monitors and keyboards acting as additional plug-in sites, or hubs. USB is a medium-bandwidth serial bus architecture supporting from 1 to 12 megabits-per-second data transfer speeds. A more detailed discussion of the USB architecture can be found in: Don Anderson, UNIVERSAL SERIAL BUS SYSTEM ARCHITECTURE, MindShare, Inc. (1997), which is hereby incorporated by reference.

Background: IEEE 1394 High-Speed Serial Bus

The IEEE 1394 Serial Bus standard describes, among other things, a high-bandwidth serial bus architecture scaleable to gigabits-per-second transfer rates. Originally designed to replace parallel SCSI in computer applications, IEEE 1394 provides the means to transmit and receive digital data using low-cost, light-weight serial cable. Although IEEE 1394 is a bus with nodes that arbitrate for access, it also resembles a network in that it is divided into three protocol layers: the physical layer ("PHY"), the link layer ("LINK"), and the transaction layer. The PHY layer is implemented in hardware, and provides the differential drivers and receivers that send and receive data through the serial cables and connections. A PHY chip provides the interface to the physical cable and/or bus. (For example, IBM manufactures a three-port transceiver, the IBM21S750PFC, which implements the physical layer protocol interface to the serial cable.) When the connection is obtained, the PHY layer receives parallel data from the link layer, and serializes and transmits the data through the cable or bus. The LINK layer provides the interface from the PHY layer to the transaction layer. It sends and receives data by forming it into packets, adding headers, and generating and checking cyclic redundancy checks (a transmission error detection scheme). The transaction layer provides a complete request-response protocol to perform the bus transactions (the operations of read, write, and lock). A more detailed discussion of the IEEE 1394 architecture can be found in: 1394-1995 IEEE STANDARD FOR A HIGH-PERFORMANCE SERIAL BUS, IEEE Computer Society (1996); and in D. Anderson, FIREWIRE SYSTEM ARCHITECTURE/IEEE 1394 (1998); both of which are hereby incorporated by reference.

Background: ACPI Specification

"ACPI" (Advanced Configuration and Power Interface) is an interface specification developed by Microsoft, Intel, and Toshiba, for the purpose of defining a standardized mechanism for providing power management functions to the operating system ("OS"). The ACPI specification is part of the OnNow Initiative, which is directed toward PCs being "always on". The ACPI interface specification defines a standard way for the system board to describe its device configuration and power control hardware interface to the OS, and application software.

Background: Device Bay Specification

The Device Bay architecture is a next-generation industry specification that defines a mechanism for easily adding and upgrading PC peripheral devices without opening the computer chassis. The broad capabilities that Device Bay provides for manageability, security, and support for a wide range of peripherals means that the technologies apply to a broad range of PC categories. These applications include business and consumer desktops and portables, small form-factor PCs, home-theater technology, consumer electronics, and PC peripherals. Possible uses of Device Bay include allowing OEMs, retailers, and end-users to easily add the appropriate peripherals to support specific application needs. For example, a CD-R drive (CD with writable media) could be added to provide a large storage medium for digital imaging or audio authoring, a DVD-ROM (Digital Video Disk-ROM) could be added to enable DVD-Video playback, or a smart card reader could be added for secure online banking or shopping. Additionally, hot-swapping capabilities provide for exchanging hard drives during drive failures, or between platforms, mobile or desktop, while the system is powered.

The Device Bay specification defines characteristics to enable compatibility and interoperability between any Device Bay peripheral and any Device Bay-enabled system bay. These characteristics include, among other things, mechanical form factors, power and thermal dissipation criteria, interfaces for USB and IEEE 1394 buses included within the Device Bay interface, connectors, registers for interfacing to ACPI architectures, and software interfaces.

The Device Bay architecture requires, among other components, the presence of a Device Bay Controller ("DBC"). The DBC may be implemented either as an ACPI-based motherboard-resident device or as a USB-based device. If employed as a USB-based device, the DBC may be either on the motherboard or external to the motherboard, such as in a docking station or even in a completely remote Device Bay tower. The Device Bay specification requires an association between the DBC, the 1394 ports, and USB ports connected to Device Bay sockets, and also requires that this association be deterministic. Because of the requirement for this association, some restrictions are placed on the architecture:

1. A system may support any number and combination of ACPI-based or USB-based DBCs. A motherboard-resident DBC may be either ACPI-based or USB-based. A DBC that is not on the motherboard is most easily implemented as a USB-based DBC. (In the earlier version 0.81 of the Device Bay specification, it was mandatory that it be implemented as a USB-based device.)

2. For an ACPI-based DBC:
   a. The USB port associated with each Device Bay socket is specified in the ACPI Name Space, hence there are no restrictions on how USB Host Controller or Hub Controller ports may be connected to Device Bay sockets.
   b. A system may support any number and combination of ACPI-based DBCs.

3. For a USB-based DBC:
   a. USB ports associated with Device Bay sockets are required to be wholly contained within the USB Host Controller or Hub Controller to which the DBC is connected; the connection of the Device Bay socket to USB port is specified in the DBC Bay Port Mapping Register.
   b. The 1394 PHY associated with Device Bay sockets is identified by the detection of a DBC connected to its PHY/Link interface. The 1394 ports are required to be contained within that single PHY; the connection of Device Bay socket to PHY port is specified in the DBC Bay Port Mapping Register. The system design is not otherwise restricted.

A particular problem faced by those working within the Device Bay specification is that the Device Bay architecture provides very little flexibility in design. The sole design for a remote (e.g. Remote Device Bay Tower) Device Bay implementation is costly, in terms both of component cost and of circuit board (real estate) cost.

Since a docking station does not have a motherboard (a motherboard is typically understood to contain the main CPU of the host computer), a docking station (as a remote non-motherboard device) may implement a USB-based DBC.

Background: GUID Determination Using a DBC

A "standard" (i.e. Device Bay-compliant) USB-based Device Bay Controller ("DBC") is principally required to: (1) support the functions of a DBC; (2) do so as a USB device; and (3) provide an interface to the 1394 PHY connection in use by Device Bay devices. The purpose of this last interface requirement is to provide a way to obtain the 1394 Global Unique ID ("GUID") corresponding to that 1394 PHY connection. (The GUID is a unique 64-bit vendor identifier.) Normally, the 1394 GUID is determined via a transaction that takes place (across the USB bus) between the host DBC driver software and the USB-based DBC (reading a DBC register to obtain the 1394 GUID).

Architecture with 1394 PHY/Link Emulation in Software

This application discloses a method to minimize the costs imposed by the current Device Bay restrictions, and specifically by the requirements for a USB-based Device Bay controller. Since the USB-based DBC and the 1394 PHY connection are both being designed into the docking station as "permanent" components, the GUID of the 1394 PHY connection is known, and can simply be provided from software. Therefore, the circuitry (and its 14 signal lines) which provides the PHY/Link interface to the DBC can be eliminated, by emulating this device in software. The PHY chips and the 1394 Link Controllers ("Links") are normally discrete devices to be introduced into host systems as adapter card products; but whether discrete or integrated with other functions, this emulation saves money by eliminating a hardware interface.

Additional software components are provided to compensate for the elimination of the PHY/Link interface between the USB-based DBC and the 1394 PHY. By inserting a proprietary "filter driver" into the USB driver stack, it becomes possible to monitor USB communications. After inserting a notebook computer into the docking station, the operating system will detect the presence of the DBC (as a USB device). When the operating system thereafter sends a query to the DBC, to get the GUID of the 1394 bus interface, this query is intercepted by the added filter driver, and the correct GUID is returned without sending the query through the DBC.

A major advantage of this solution is to provide a more cost effective implementation of Device Bay support for the next generation docking station.

A further advantage of the disclosed architecture is that off-the-shelf chips can be used for the DBC and for the 1394 PHY interface chip. The present application teaches that the additional hardware interface from the DBC to the 1394 link can be eliminated, even in a USB device bay controller system, simply by emulating in software the query response which is the primary function of this hardware interface. Thus, the device bay controller can still be an off-the-shelf part, and the 1394 PHY interface can also be another off-the-shelf part, and the two do not have to be specified as a set, i.e., they can be chosen independently.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Definitions

Following is a list of definitions of terms used throughout the application:

"1394"—see IEEE 1394.

1394 PHY/Link interface—normally, as of 1998, two interface devices required at each node of a 1394 network.

"ACPI" (Advanced Configuration and Power Interface) is an interface specification developed by Microsoft, Intel, and Toshiba, for the purpose of defining a standardized mechanism for providing power management functions to the operating system ("OS"). The ACPI specification is part of the OnNow Initiative, which is directed toward PCs being "always on". The ACPI interface specification defines a standard way for the system board to describe its device configuration and power control hardware interface to the OS, and application software.

DBC (Device Bay Controller)—a circuit device that resides on the host side of the bay and contributes to the following processes: device insertion, device removal request, device enumeration, staged power consumption, and mapping USB and 1394 ports to bays.

Device Bay—the overall concept of providing devices and bays under a standardized and interchangeable environment, as specified in the Device Bay specification.

Device Bay subsystem—an implementation of the Device Bay concept. In a Device Bay subsystem, all bays are controlled by one DBC.

Device Driver—a distinct program module that is integrated with an operating system to provide a standard interface between an application and an external device.

DMA (Direct Memory Access)—a method of gaining direct access to main storage to achieve data transfer without involving the CPU.

The term "Externally-removable modules" is used in this application to refer to modules which can be freely inserted and removed by a user without using a screwdriver or opening up the chassis of the computer. Such modules may or may not be Device Bay modules or Multibay modules.

Filter driver—a piece of software that monitors (or traps) information and performs a desired function with the information before sending it on.

"GUID" (Global Unique ID) is an identification value used in the IEEE 1394 bus standard. The GUID is a unique 64-bit vendor identifier, and each 1394 PHY device must have one.

IEEE 1394 High Speed Serial Bus—a new interconnect technology which provides a means to transmit and receive digital data using a low-cost, light-weight serial cable. The standard provides for high-speed half-duplex data transmission capable of handling video applications. Another unique feature is the peer-to-peer transfer of data. Each node can transmit and receive data from any other node on an equal basis. Although a network will usually contain a host PC at one of its nodes, the host is not required to intervene in bus arbitration and data transactions, and is free to tend to its own activities. Additionally, nodes can be plugged and unplugged, or interchanged at will, even when powered up. Each node receives data and re-transmits it to its neighbors, functioning as a repeater. If the network topology changes, the system reconfigures itself, making configuration DIP switches unnecessary. Up to 63 devices may be connected on a single bus segment, but segments may be bridged together, allowing a total of 63,000 devices to be connected. The Serial Bus is divided into three protocol layers: the physical layer, the link layer, and the transaction layer. The physical layer and link layer are implemented in hardware, and the transaction layer is implemented in firmware.

IRQ (interrupt request)—a signal to a computer that temporarily suspends the normal sequence of a routine, and transfers control to a special routine.

LINK (link layer)—the middle layer, in the stack of three protocol layers defined for the Serial Bus, that provides the service to the transaction layer of one-way data transfer with confirmation of reception.

LINK chip—the physical implementation of the link layer protocol and portions of the transaction layer protocol into a discrete device (e.g. ASLM040 by Advanced Technology and Systems Co.). When the link wants to send data, it "tells" the PHY to gain access to the serial bus.

Miniport—the hardware-specific portion of the software driver. For example, network interface cards produced by numerous vendors all have a piece of software common to the drivers. However, some portions of the software must be specifically related to the vendor design. The miniport driver is the software specific to the particular vendor design.

OHCI (Open Host Controller Interface)—an industry standard whereby the operating system environment can communicate through a universal software driver instead of implementing an individualized driver for each particular piece of 1394 host silicon.

PHY (physical layer)—the bottom layer, in a stack of three protocols defined for the Serial Bus, that translates the logical symbols used by the link layer into electrical signals on the different Serial Bus media.

PHY chip—the physical implementation of the PHY protocol layer into a device (e.g. the IBM 21S750PFC transceiver chip).

Plug-and-Play ("PnP"): the functionality in an operating system which permits the system to automatically configure itself correctly to interface to any compatible devices which a user may insert.

SCSI (Small Computer Systems Interface)—a bus architecture allowing multiple SCSI devices to be daisy-chained on a common bus.

Transaction layer—the top layer, in a stack of three protocol layers defined for the Serial Bus, that defines a request-response protocol to perform bus operations of type read, write, and lock.

Conventional Implementation with 1394 PHY/Link Interface

Further details of the embodiments of FIGS. 2 and 3 will now be discussed in detail, to clarify the differences and advantages of embodiments like that of FIG. 1.

Figure 3:
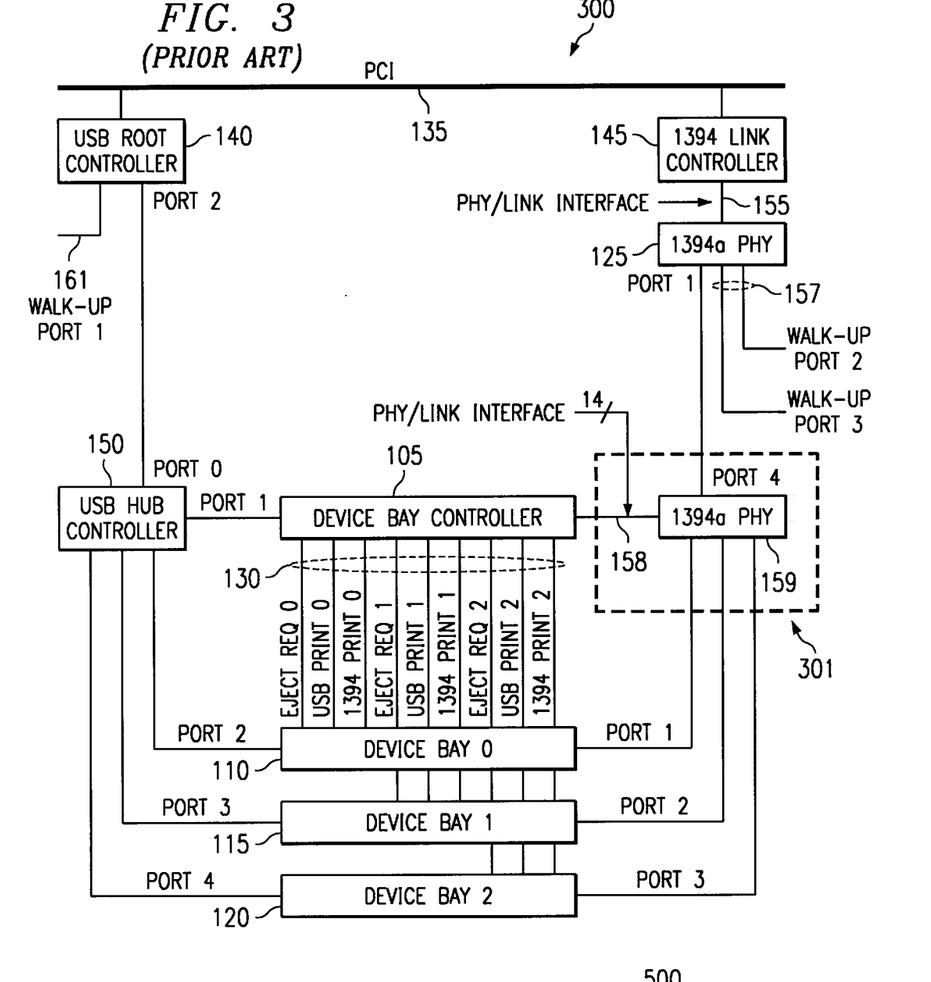
FIG. 3 shows a system level architectural diagram of a prior-art USB-based implementation with a 1394 PHY interface between the DBC and a 1394 PHY.

FIG. 3 shows a system level diagram of a conventional USB-based Device Bay implementation. Note that this implementation (as compared with FIG. 1) includes extra circuitry 301, including a 1394 PHY/Link Interface lines 158 (e.g. 14 lines) and 1394 PHY chip 159 between the DBC 105 and a 1394 PHY chip 125. In the case of a USB-based DBC and Microsoft PnP operating system, the DBC is identified (or "enumerated," in PnP parlance) by the USB bus class enumerator. The USB bus class enumerator accomplishes this identification by detecting the occurrence of a new USB device that reports a device class code of Device Bay Controller. This leads the PnP operating system to load the DBC/USB device class driver. Thereafter the operating system queries the DBC, to get the GUID data for the 1394 bus, and the DBC gets this information through the extra circuitry 301. This architectural restriction places a burden on certain designs by requiring the extra circuitry 301.

The circuitry 300 connects to a PCI bus 135. Controllers 140 and 145 provide interface connections to the PCI bus 135 for USB and 1394 controller circuitry, respectively. The USB Hub Controller 150 provides a common interconnect for signal traffic between the DBC 105, devices connected to Device Bay connections 110, 115, and 120, and also to the USB Root controller 140. USB Controller 140 also provides connection to external USB-type devices over line 161. It is possible to daisy-chain USB devices using interconnections of this type.

For interfacing with 1394-based devices, a first 1394 PHY chip 125 connects to the 1394 Link Controller 145 over PHY/LINK Interface lines 155. Furthermore, the first 1394 PHY chip 125 provides both the physical connection over lines 157 to other Device Bay devices external to the system containing circuitry 300, and connection to an additional, second 1394 PHY chip 159. The second 1394 PHY chip 159 provides port-access to Device Bay connections 110, 115, and 120, and connects to the DBC 105 over PHY/LINK Interface lines 158. Interconnect lines 130 provide connection to each of the Device Bays 110, 115, and 120, from the DBC 105.

Background: ACPI-based DBC Implementation

Figure 2:
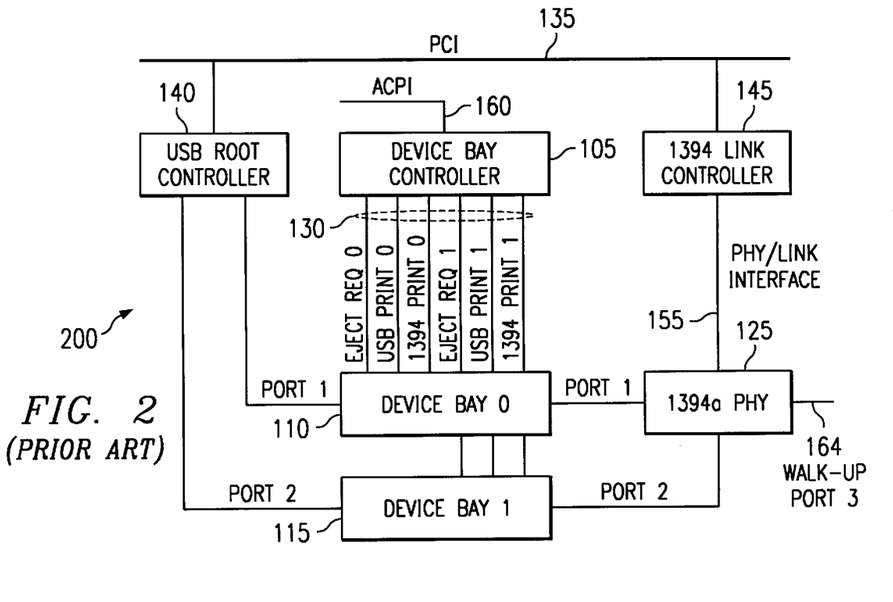
FIG. 2 shows a prior-art ACPI-based implementation with no PHY/LINK Interface between the DBC and a 1394 PHY chip.

FIG. 2 shows a prior-art ACPI-based DBC implementation with no PHY/LINK Interface 158 (FIG. 3) between the DBC 105 and the first 1394 PHY chip 125. In the ACPI-based motherboard-resident DBC architecture, the relationship between the DBC and 1394 is static. The 1394-to-Device Bay relationship is determined via the ACPI Name Space objects, and it is this which obviates the need for any Device Bay-to-1394/Link interface. The important point here is that since this is an ACPI implementation, there is no need for a PHY/Link interface between the ACPI-based DBC and the 1394 Host Controller. The circuit discussion of FIG. 3 applies here. Notable differences are that circuit 200 includes an operating system interface connection 160 which provides the ACPI interface to the DBC 105. Additionally, the 1394 PHY chip 125 handles both the interconnect to external 1394-type devices over line 164, and to Device Bay bays 110 and 115.

Optimized Device Bay Implementation

Figure 1:
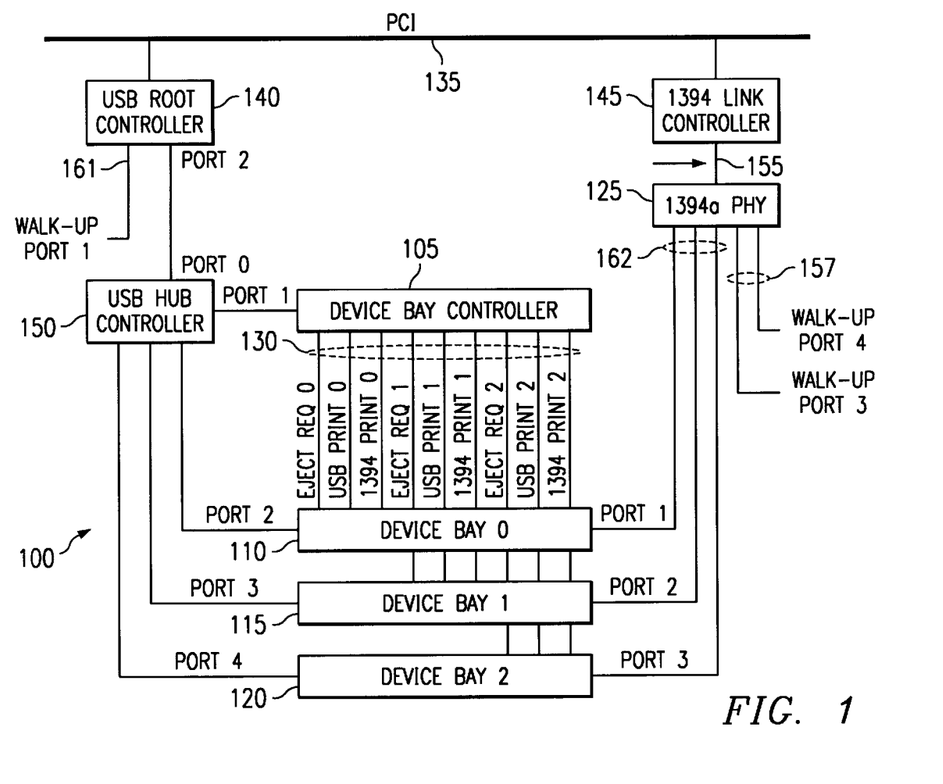
FIG. 1 shows a sample USB Device Bay implementation with reduced circuitry.

FIG. 1 shows a Device Bay device with the reduced circuitry embodiment—the 1394 PHY/Link Interface and PHY chip are eliminated from between the USB-based DBC 105 and 1394 PHY chip 125 (see FIG. 3, circuitry 301). The Device Bay circuitry 100 is applicable to, for example, a docking station. Again, the circuit discussion of FIG. 3 applies here. The function of the eliminated circuitry has now been emulated in software.

A minimum configuration might be a DBC 105 and one bay 110. The most likely configuration comprises a USB Hub Controller 150, a 1394 PHY chip 125, a 1394 Link Controller 145, and several bays.

Bus Filters

Figure 7:
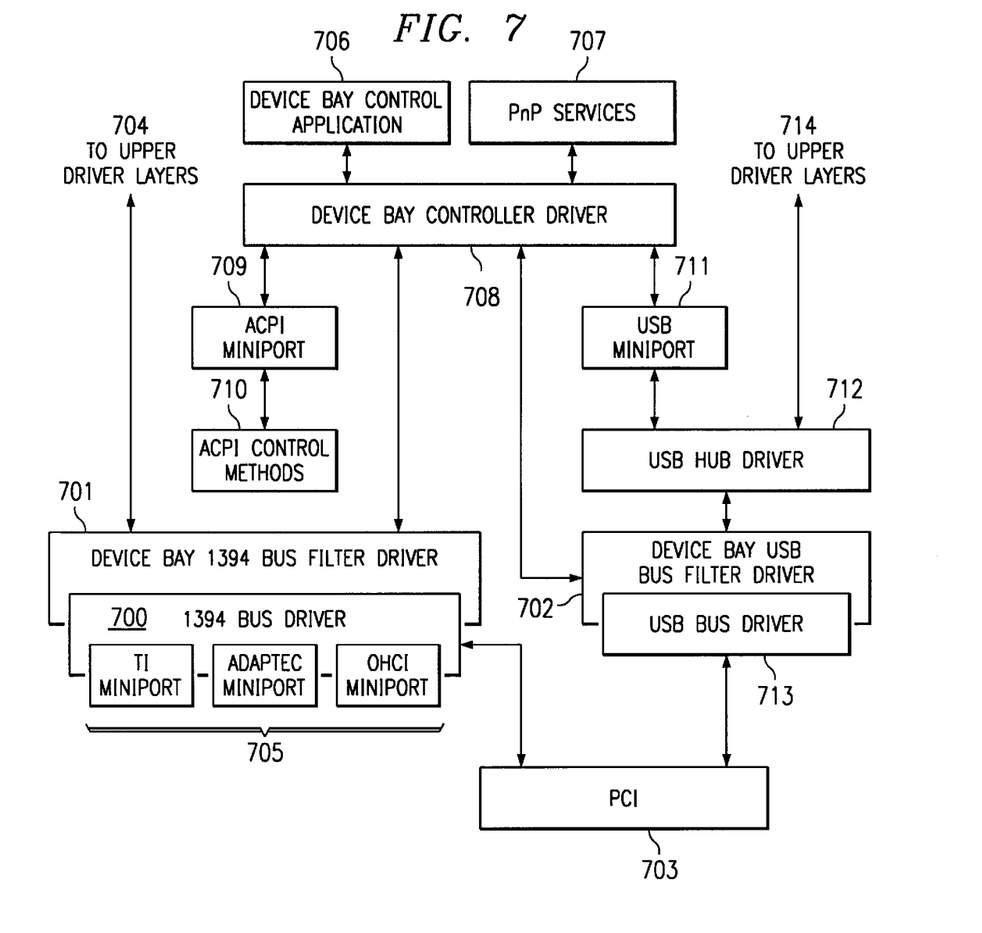
FIG. 7 shows a software block diagram using the filtering program.

FIG. 7 shows a software block diagram using the software filters. The shaded boxes indicate the software which is required for Device Bay compatibility. The Device Bay control application software 706 interfaces to the Device Bay controller driver 708 to send and receive information pertinent to the implementation of Device Bay devices. The OS PnP software 707 also interfaces to the Device Bay controller driver 708 for similar reasons. The Device Bay controller driver 708 may accommodate two different interfaces: ACPI and USB. The ACPI miniport software driver 709 handles communications between the Device Bay controller driver 708 and the ACPI control methods software 710.

The Device Bay software architecture require filter drivers both on the USB bus and on the 1394 bus in order to implement the necessary Device Bay behavior. Information packets sent along both the USB and 1394 buses need to be modified to implement the emulation required to support the disclosed innovative architecture.

On the USB side, the USB miniport software 711 provides the interface between the Device Bay controller driver 708 and the USB hub driver software 712. The USB hub driver 712 also interfaces to upper level driver layers 714 and the Device Bay USB Bus Filter Driver 702'. The USB filter driver 702' is placed into the USB driver stack to intercept selected traffic.

On the 1394 side, the Device Bay 1394 Bus Filter Driver 701 manages traffic on the 1394 interface to the Device Bay modules (under the Device Bay Controller driver 708). (For example, Windows 95™ and Windows NT™ operating systems support 1394 devices via the 32-bit Windows Driver Model, or "WDM-32", software architecture.) Normal driver activity proceeds between the 1394 driver 700 and miniport drivers 705. The 1394 driver 700 also provides direct access to the PCI bus 703. The 1394 filter driver 701 also interfaces to upper level driver layers 704.

Figure 8:
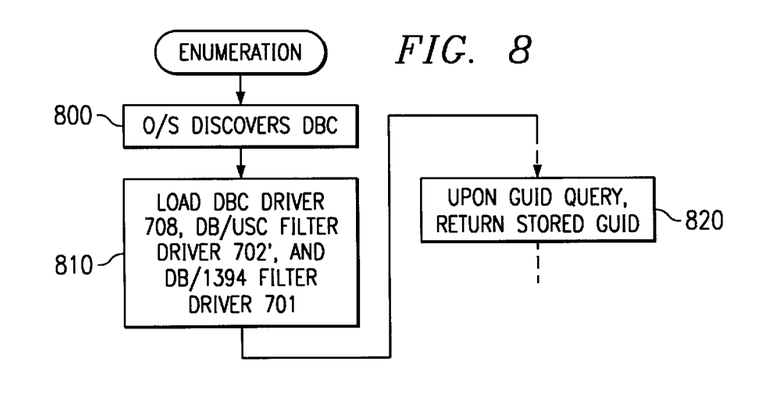
FIG. 8 shows a general sequence of software steps taken to detect a correct GUID without a direct interface from the DBC to the 1394 bus.

FIG. 8 shows a general sequence of software steps taken to detect a correct GUID without a direct interface from the DBC to the 1394 bus. In an example where a notebook computer is inserted into a docking station, the operating system discovers the (USB-based) DBC as a USB device during enumeration (Block 800). The operating system then (Block 810) loads the software components which are required for Device Bay operation, namely DBC driver 708, DB/USB filter driver 702', and DB/1394 filter driver 701.

Thereafter (Block 820), when the DBC driver 708 sends a GUID query to the DBC 105, to get the GUID of the 1394 interface, the filter driver 702' intercepts this query and returns the correct GUID. The correct GUID is known by the manufacturer, since the manufacturer knows which 1394 interface chips 125 and 145 are being assembled into the systems being built. (Of course, if the manufacturer changes to a different version of the 1394 PHY interface chip 125, the GUID loaded by the filter driver 702' must be changed accordingly.) Of course the DB/USB filter driver software has many other functions, but most of these are standard.

Figure 9:
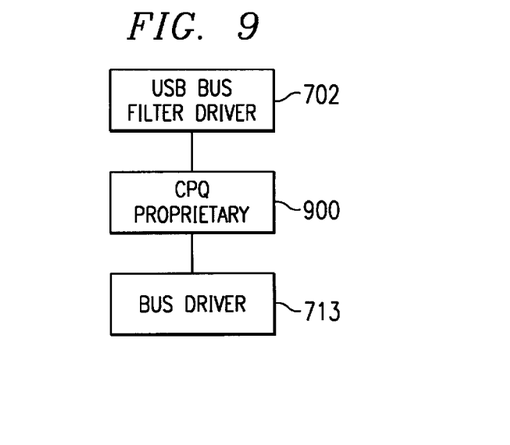
FIG. 9 shows how the software block diagram of FIG. 7 is modified to add proprietary software structures which implement the software steps used with the hardware architecture of FIG. 1.

In fact, in the presently preferred embodiment (using Windows 95 or Windows NT) the USB bus filter driver is required to be a standard software component. The special handling of GUID queries is therefore handled, in the presently preferred embodiment, by an additional software layer. As shown in FIG. 9, the manufacturer inserts a proprietary software layer 900 between the Microsoft-standard filter driver 702 and the bus driver software 713. This proprietary software layer 900 intercepts the GUID queries to DBC 105 (which never receives them), and instead inserts the stored GUID value. (Thus the combination of proprietary layer 900 with Microsoft-standard filter driver 702 are the components, in this example, of the modified filter driver 702' shown in FIG. 7.)

Portable Computer Embodiment

Figure 4:
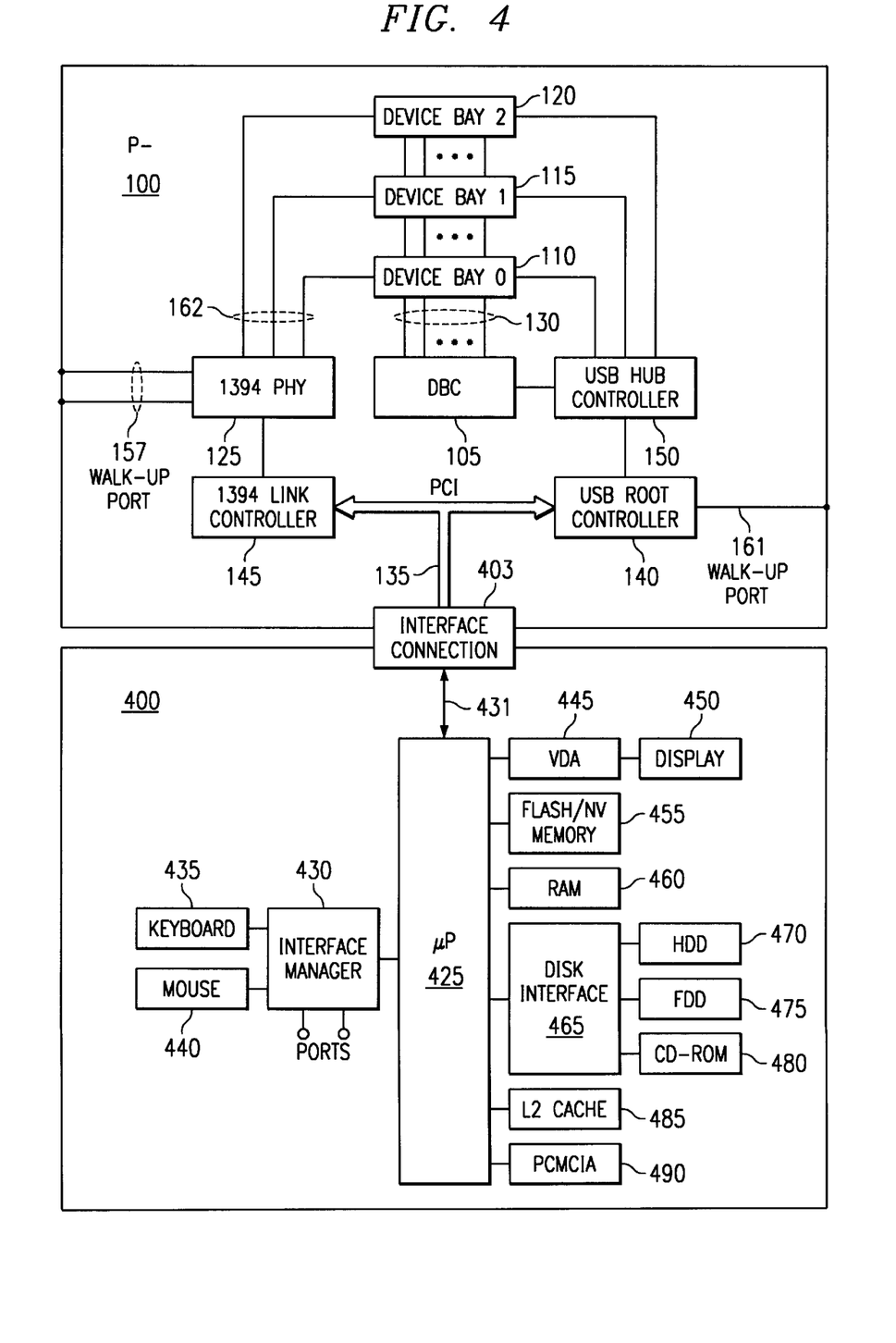
FIG. 4 shows a block diagram of a portable computer system interfacing to a Device Bay docking station according to the presently preferred embodiment.

FIG. 4 shows a block diagram of a portable computer system interfacing to a Device Bay docking station according to the presently preferred embodiment. The computer's operating system comprises the necessary software code to emulate the function formerly provided by the eliminated 1394 PHY/Link circuitry. The computer 400 PCI bus 431 interfaces with docking station 100 PCI bus 135 through an interface connection 403. The architecture of the docking station 100 operation and components was previously discussed above (FIG. 3). The computer system 400 comprises in this example:

user input devices (e.g. keyboard 435 and mouse 440);

at least one microprocessor 425 which is operatively connected to receive inputs from said input device, through an interface manager chip 430 (which also provides an interface to the various ports); the microprocessor also interfaces via the PCI bus 431 to the docking station system 100 for access to any Device Bay devices in use in the docking station 100;

a memory (e.g. flash or non-volatile memory 455 and RAM 460), which is accessible by the microprocessor;

a data output device (e.g. display 450 and video display adapter card 445) which is connected to output data generated by microprocessor; and a magnetic disk drive 470 which is read-write accessible, through an interface unit 465, by the microprocessor.

Optionally, of course, many other components can be included, and this configuration is not definitive by any means. For example, the portable computer may also include a CD-ROM drive 480 and floppy disk drive ("FDD") 470 which may interface to the disk interface controller 465. Additionally, L2 cache 485 may be added to speed data access from the disk drives to the microprocessor, and a PCMCIA 490 slot accommodates peripheral enhancements.

Device Bay Docking Station

Figure 5:
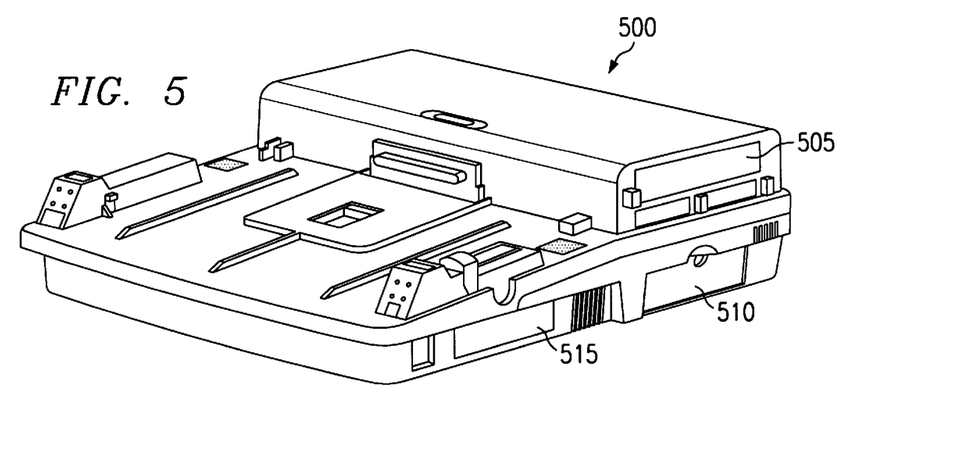
FIG. 5 shows a docking station with the innovative embodiment.

FIG. 5 shows a docking station with the innovative embodiment. Docking station 500 may comprise several device bays for interfacing to USB or 1394 devices. These devices may include a removable hard drive 505, a removable CD-ROM drive 510, and other interface modules for making external connections, such as a network interface card 515.

Device Bay Docking Station to Portable Computer

Figure 6:
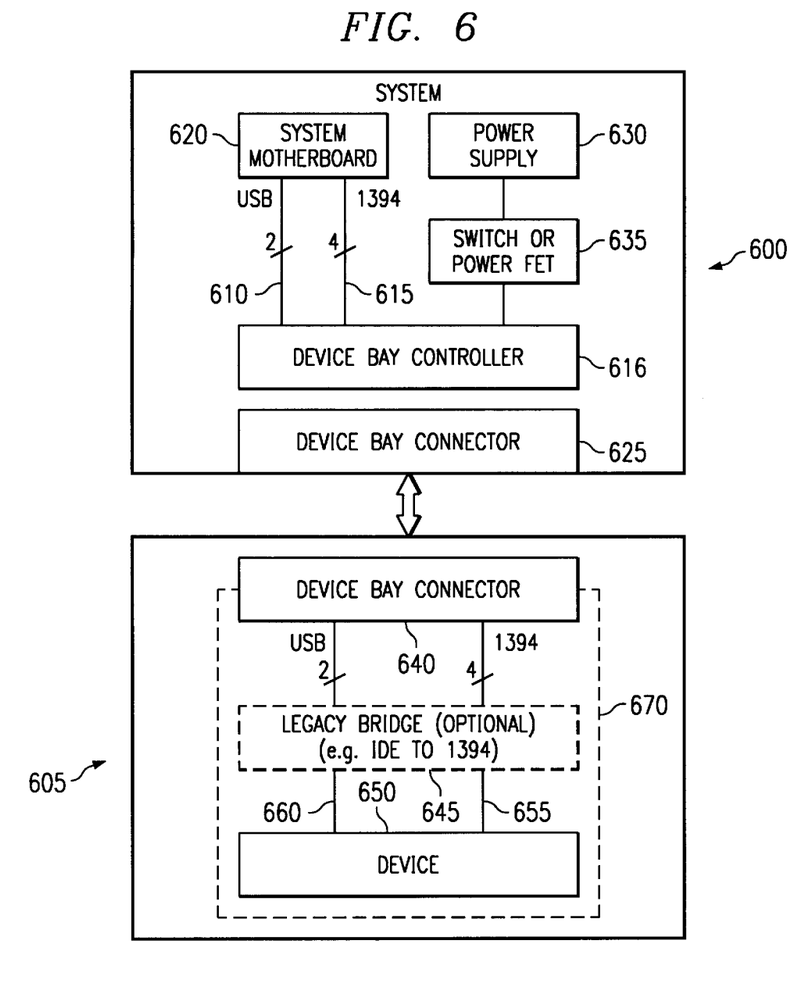
FIG. 6 shows a block diagram of a relationship between a Device Bay device located within a docking station and a Device Bay-enabled portable computer.

FIG. 6 shows the relationship between a Device Bay device module 670 inserted into a docking station 605 and a Device Bay-enabled portable computer 600 with a motherboard board 620. The interface to the device 650 is either USB, IEEE 1394, or a combination of the two. In this example, USB lines 610 and 1394 lines 615 interconnect the motherboard 620 through the Device Bay connector 625 to the Device Bay controller 616. The lines carry the control and data signals for the appropriate device connected to Device Bay connector 625 (USB-based and/or 1394-based device). A power FET or switch 635 connected to the system power supply 630 enables the computer to control peripheral device power. If the particular device is not being used it can be powered down to conserve energy. On the docking station side 605, a Device Bay connector 640 designed into the Device Bay module 670 provides a standard connection between Device Bay devices. A legacy bridge 645 may be required to accommodate interfaces to legacy devices. The legacy bridge 645 that enables existing devices to work with Device Bay is located on the device module 670 itself. In this example, an IDE-to-1394 legacy bridge 645 enables legacy IDE storage devices inserted into the docking station 605 to work with Device Bay. Note that the configuration on the docking station side 605 does not require signal pins for both USB 660 and 1394 655 serial buses (as drawn). For example, if the device is exclusively an IEEE 1394 device, only four 1394 pins 655 must be provided and the USB pins may be omitted.

According to a disclosed class of innovative embodiments, there is provided: A computer system, comprising: a hardware interface to a bus which requires unique identifiers for each active device on the bus; a customized interface controller which is electrically connected to connectors for externally-removable modules which interface to said bus; and a software structure which intercepts at least some queries, requesting said unique identifiers, which may be directed to said interface controller by an operating system, and automatically returns a unique identifier which is correct for said hardware interface, without allowing said interface controller to respond to said query.

According to a disclosed class of innovative embodiments, there is provided: A Device Bay-compatible computer system, comprising: a Device Bay insertion location, and a Device Bay Controller which is electrically connected to connectors for externally-removable device bay modules in said Device Bay insertion location; an IEEE 1394 hardware interface; and a software structure which intercepts at least some unique-identifier queries directed to said Device Bay Controller by an operating system, and returns correct unique-identifier data for said IEEE 1394 interface without allowing said Device Bay Controller to respond to said query.

According to a disclosed class of innovative embodiments, there is provided: A system, comprising: at least one device insertion location having a standard interface for components which may be inserted therein, said standard interface allowing said components to use any one of multiple different signal interface formats; and control electronics comprising an interface controller connected to monitor and control said components; first bus interface circuitry, which provides data communications between said interface controller and a first system-side serial bus connection; and a processor programmed and connected to detect at least one query directed through said interface controller to obtain information from a second bus interface circuitry to which said interface controller does not have a direct hardware interface, and thereupon to force a response to said query which is correct for the hardware actually present.

According to a disclosed class of innovative embodiments, there is provided: A system, comprising: at least one device bay providing a standard interface for components which may be inserted therein, said standard interface allowing said components in said device bay to use either first or second signal interface formats; and control electronics, comprising Device Bay Controller circuitry for monitoring and controlling said components, first bus interface circuitry which provides data communication to said Device Bay Controller circuitry and to said components using said first signal interface format, and second bus interface circuitry which provides data communication to said components using said second signal interface format, and which has no direct hardware interface to said Device Bay Controller circuitry; and a processor programmed and connected to detect at least one query directed through said Device Bay Controller circuitry to obtain information related to the operation of said second bus interface circuitry, and thereupon to force a response to said query which is correct for the hardware actually present.

According to a disclosed class of innovative embodiments, there is provided: A method for initializing an interface to a bus which requires unique identifiers, comprising the acts of: in software, intercepting at least some queries which are directed from operating system software to an interface control component requesting one or more of said unique identifiers; and automatically returning a unique identifier which is correct for the components which are physically present, without allowing said interface controller to respond to said query.

According to a disclosed class of innovative embodiments, there is provided: A software method for operating a Device Bay architecture which includes one or more buses, of which one bus is a 1394-type bus which is connected to a physical device bay but not to any Device Bay Controller, comprising the steps of: (a.) operating a software driver stack which includes a filter driver; (b.) detecting at least one unique-identifier query directed to a Device Bay Controller which does not have a direct hardware interface to the 1394-type bus; and (c.) in software, forcing a response to said query which is correct for the hardware actually present on said 1394-type bus, without requiring any response from the Device Bay Controller.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, since a proprietary software layer 900 is preferably added, other manufacturer-customized proprietary functions can easily be added if desired.

It should also be noted that the disclosed innovative ideas are not limited only to Windows, DOS or UNIX systems, but can also be implemented in other operating systems.

It should also be noted that the disclosed innovative ideas are not limited only to systems using ISA, EISA, and/or PCI busses, but can also be implemented in systems using other bus architectures.

It should also be noted that the disclosed innovative ideas are not limited only to systems based on an ×86-compatible microprocessor, but can also be implemented in systems using 680×0, RISC, or other processor architectures.

It should also be noted that the disclosed innovative ideas are not by any means limited to systems using a single-processor CPU, but can also be implemented in computers using multiprocessor architectures.

It should also be noted that the disclosed innovative ideas are not by any means limited to single-user desktop systems, but are also applicable to network servers and routers, mainframe transaction processing systems, terminals, engineering workstations, and portable computers to which an external keyboard can be attached.

It should be also noted that the disclosed innovative ideas are not limited to docking stations, but also to any peripheral device or system compatible with the aforementioned specifications.

It should also be noted that a 1394 Host Controller may be advantageously used in the docking station (in place of the 1394 Link Controller illustrated in FIG. 1). The 1394 Host Controller provides fully backward-compatible Device Bay support for current generation notebooks that lack the requisite motherboard-resident 1394 Host Controller.

What is claimed is:

1. A computer system, comprising:
    a hardware interface to a bus which requires unique identifiers for each active device on the bus;
    a customized interface controller which is electrically connected to connectors for externally-removable modules which interface to said bus; and
    a software structure which
        intercepts at least some queries, requesting said unique identifiers, which may be directed to said interface controller by an operating system,
        and automatically returns a unique identifier which is correct for said hardware interface, without allowing said interface controller to respond to said query.

2. The system of claim 1, wherein said interface controller is a Device Bay Controller.

3. The system of claim 1, wherein said unique-identifier data comprises a GUID.

4. A Device Bay-compatible computer system, comprising:
    a Device Bay insertion location, and a Device Bay Controller which is electrically connected to connectors for externally-removable device bay modules in said Device Bay insertion location;
    an IEEE 1394 hardware interface; and
    a software structure which intercepts at least some unique-identifier queries directed to said Device Bay Controller by an operating system, and returns correct unique-identifier data for said IEEE 1394 interface without allowing said Device Bay Controller to respond to said query.

5. The system of claim 4, wherein said unique-identifier data comprises a GUID.

6. The system of claim 4, wherein said device bay is part of a docking station.

7. The system of claim 4, wherein said Device Bay Controller interfaces to a system bus through a USB hub controller.

8. A system, comprising:
    at least one device insertion location having a standard interface for components which may be inserted therein, said standard interface allowing said components to use any one of multiple different signal interface formats; and
    control electronics comprising
        an interface controller connected to monitor and control said components;
        first bus interface circuitry, which provides data communications between said interface controller and a first system-side serial bus connection; and
    a processor programmed and connected.
        to detect at least one query directed through said interface controller to obtain information from a second bus interface circuitry to which said interface controller does not have a direct hardware interface, and thereupon
        to force a response to said query which is correct for the hardware actually present.

9. The system of claim 8, wherein said interface controller is connected directly to a USB but not to any IEEE 1394 bus.

10. The system of claim 8, wherein said first bus is a USB.

11. The system of claim 8, wherein said second bus is an IEEE 1394 bus.

12. The system of claim 8, wherein said device insertion location is part of a docking station.

13. The system of claim 8, wherein said interface controller is fully compatible with version 0.81 or higher of the Device Bay specification.

14. A system, comprising:
    at least one device bay providing a standard interface for components which may be inserted therein, said standard interface allowing said components in said device bay to use either first or second signal interface formats; and
    control electronics, comprising
        Device Bay Controller circuitry for monitoring and controlling said components,
        first bus interface circuitry which provides data communication to said Device Bay Controller circuitry and to said components using said first signal interface format, and second bus interface circuitry which provides data communication to said components using said second signal interface format, and which has no direct hardware interface to said Device Bay Controller circuitry; and a processor programmed and connected
to detect at least one query directed through said Device Bay Controller circuitry to obtain information related to the operation of said second bus interface circuitry, and thereupon to force a response to said query which is correct for the hardware actually present.

15. The system of claim 14, wherein said Device Bay Controller circuitry is connected directly to a USB but not to any IEEE 1394 bus.

16. The system of claim 14, wherein said first bus is a USB.

17. The system of claim 14, wherein said second bus is an IEEE 1394 bus.

18. The system of claim 14, wherein said device bay is part of a docking station.

19. The system of claim 14, wherein said device bay conforms to a Device Bay specification.

20. The system of claim 14, wherein said Device Bay Controller circuitry is USB-based.

21. A method for initializing an interface to a bus which requires unique identifiers, comprising the acts of:

in software, intercepting at least some queries which are directed from operating system software to an interface control component requesting one or more of said unique identifiers; and automatically returning a unique identifier which is correct for the components which are physically present, without allowing said interface controller to respond to said query.

22. The method of claim 21, wherein said bus is a 1394-type bus, and said identifiers are GUID data.

23. The method of claim 21, wherein said interface controller is a Device Bay Controller.

24. A software method for operating a Device Bay architecture which includes one or more buses, of which one bus is a 1394-type bus which is connected to a physical device bay but not to any Device Bay Controller, comprising the steps of:

(a.) operating a software driver stack which includes a filter driver;

(b.) detecting at least one unique-identifier query directed to a Device Bay Controller which does not have a direct hardware interface to the 1394-type bus; and (c.) in software, forcing a response to said query which is correct for the hardware actually present on said 1394-type bus, without requiring any response from the Device Bay Controller.

25. The method of claim 24, wherein said Device Bay Controller is fully compatible with version 0.81 or higher of the Device Bay specification.

26. The method of claim 24, wherein said driver stack is a USB driver stack.

27. The method of claim 24, wherein said filter driver is a USB filter driver.

28. The method of claim 24, wherein said step (c.) uses a known GUID of an interface device which is physically present.

* * * * *